(12) United States Patent
Sekiya

(10) Patent No.: US 7,873,438 B2
(45) Date of Patent: Jan. 18, 2011

(54) MOBILE APPARATUS AND CONTROL PROGRAM THEREFOR

(75) Inventor: Makoto Sekiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 12/323,851

(22) Filed: Nov. 26, 2008

(65) Prior Publication Data

US 2009/0143932 A1  Jun. 4, 2009

(30) Foreign Application Priority Data

Nov. 30, 2007  (JP) ............................. 2007-311477

(51) Int. Cl.
*G05B 19/04* (2006.01)
(52) U.S. Cl. ..................... 700/255; 700/90; 700/245; 700/248; 700/250; 700/253; 701/301; 701/302; 706/14; 706/45; 706/46; 901/1; 901/46; 901/50
(58) Field of Classification Search ................ None
See application file for complete search history.

(56) References Cited

U.S. PATENT DOCUMENTS

| 7,474,945 | B2 * | 1/2009 | Matsunaga | 701/25 |
| 7,769,491 | B2 * | 8/2010 | Fukuchi et al. | 700/253 |
| 2005/0216181 | A1 * | 9/2005 | Estkowski et al. | 701/200 |
| 2006/0095160 | A1 * | 5/2006 | Orita et al. | 700/248 |
| 2006/0106496 | A1 * | 5/2006 | Okamoto | 700/253 |
| 2007/0027579 | A1 * | 2/2007 | Suzuki et al. | 700/245 |
| 2007/0198128 | A1 * | 8/2007 | Ziegler et al. | 700/245 |

(Continued)

FOREIGN PATENT DOCUMENTS

JP     2005-202978     7/2005

(Continued)

OTHER PUBLICATIONS

Nak Yong Ko et al: "Avoidability meausre in moving obstacle avoidance problem and its use for robot motion planning", Intelligent Robots and Systems '96, IROS 96, Proceedings of the 1996 L EEE/RSJ International Conference on Osaka, Japan Nov. 4-8, 1996, New York, NY, USA, IEEE, US vol. 3, Nov. 4, 1996, pp. 1296-1303, XP010212587 ISBN: 978-0-7803-3213-3.

(Continued)

*Primary Examiner*—Khoi Tran
*Assistant Examiner*—Jonathan L Sample
(74) *Attorney, Agent, or Firm*—Rankin, Hill & Clark LLP

(57) ABSTRACT

A mobile apparatus capable of moving or acting autonomously while flexibly avoiding contact with a moving object in accordance with various situations is provided. In a case where a second safety condition is not satisfied because, e.g., a first target trajectory cannot be found, a second target trajectory causing a first spatial element to approach the boundary of an element passing region is searched for and determined. A robot autonomously approaches the boundary of the passable region in accordance with the second target trajectory determined as a provisional target trajectory, and stops at the position corresponding to the end point of the second target trajectory. Such movement of the robot along the second target trajectory increases the space, making it possible to prompt an object to move through the space.

18 Claims, 10 Drawing Sheets

U.S. PATENT DOCUMENTS

| | | | |
|---|---|---|---|
| 2007/0282531 A1* | 12/2007 | Park et al. | 701/301 |
| 2008/0033649 A1* | 2/2008 | Hasegawa et al. | 701/301 |
| 2008/0040040 A1* | 2/2008 | Goto et al. | 701/301 |
| 2008/0249662 A1* | 10/2008 | Nakamura | 700/253 |

FOREIGN PATENT DOCUMENTS

| | | |
|---|---|---|
| JP | 2006-092253 | 4/2006 |
| WO | 2008/032673 | 3/2008 |

OTHER PUBLICATIONS

Tsubouchi T et al: "Iterated forecast and planning algorithm to steer and drive mobile robot in the presence of multiple moving objects", Proceedings, 1995 IEEE/RSJ International Conference on Intelligent Robots and Systems, Human Robot Interaction and Cooperative Robots (Cat. No. 95CB35836) IEEE Comput. Soc. Press Los Alamitos, CA, USA, vol. 2, 1995, pp. 33-38 vol. 2, XP002513289.

* cited by examiner

MOBILE APPARATUS AND CONTROL PROGRAM THEREFOR

BACKGROUND OF THE INVENTION

1. Field of the Invention

The present invention primarily relates to an apparatus which moves autonomously.

2. Description of the Related Art

As robots have become more sophisticated in functionality, there are increasing opportunities for the robots to perform jobs or works such as carrying luggage or guiding human beings to their destinations. As such, in the environment where robots and human beings coexist, the need for each robot to move while preventing collision with the human beings and the other robots is increasing. In this relation, a technique to cause an autonomous mobile apparatus to stay in a predetermined area to allow human beings or other moving objects to overtake or pass by, for example, is proposed (see Japanese Patent Application Laid-Open No. 2005-202978).

According to the conventional technique described above, however, the area for the mobile apparatus to stay to avoid contact with the other moving objects should be defined in advance. Thus, in the situation where such an area cannot be defined because it would limit the range in which the moving objects can move and hence restrict their movements, the robot has difficulty in moving in cooperation with the human beings and the other robots surrounding the robot.

SUMMARY OF THE INVENTION

In view of the foregoing, an object of the present invention is to provide, among others, a mobile apparatus capable of moving or acting autonomously while flexibly preventing contact with a moving object in accordance with various situations.

A mobile apparatus according to a first invention includes a control device and has its operation controlled by the control device to autonomously move along a target trajectory representing changes in a target position defined in a two-dimensional model space. The control device includes a first processing unit, a second processing unit, and a third processing unit, wherein the first processing unit recognizes a region through which the mobile apparatus is capable of passing as an element passing region in the model space, recognizes the mobile apparatus and a trajectory representing changes in position of the mobile apparatus as a first spatial element and a first trajectory representing changes in a first position, respectively, recognizes an object and a trajectory representing changes in position of the object as a second spatial element and a second trajectory representing changes in a second position, respectively, and recognizes the second spatial element continuously or intermittently expanded in accordance with the changes in the second position as an expanded second spatial element, wherein the second processing unit determines whether a first safety condition is satisfied based on the recognition result by the first processing unit, the first safety condition specifying that the possibility of contact between the first spatial element and the second spatial element in the element passing region is low, wherein on the condition that the second processing unit determines that the first safety condition is not satisfied, the third processing unit searches for a first target trajectory based on the recognition result by the first processing unit, the first target trajectory allowing the first spatial element to avoid contact with the expanded second spatial element in the element passing region, wherein the second processing unit determines whether a second safety condition is satisfied, the second safety condition specifying that the first target trajectory has been searched for and determined by the third processing unit, wherein on the condition that the second processing unit determines that the second safety condition is not satisfied, the third processing unit searches for a second target trajectory based on the recognition result by the first processing unit, the second target trajectory causing the first spatial element to approach a boundary of the element passing region, and wherein the control device controls the operation of the mobile apparatus by regarding the first target trajectory as the target trajectory in the case where the second processing unit determines that the second safety condition is satisfied, whereas the control device controls the operation of the mobile apparatus by regarding the second target trajectory provisionally as the target trajectory and regarding a position corresponding to an end point of the second target trajectory as a stop position in the case where the second target trajectory has been searched for and determined by the third processing unit.

According to the mobile apparatus of the first invention, in the case where the first safety condition is not satisfied, i.e., in the case where there is a high possibility that the mobile apparatus comes into contact with an object, a first target trajectory allowing the first spatial element to avoid contact with the expanded second spatial element in the model space is searched for and determined. The mobile apparatus autonomously moving along the first target trajectory determined as the target trajectory can avoid contact between the mobile apparatus and the object. Even when the first safety condition is satisfied, in the case where the second safety condition is not satisfied, i.e., in the case where the first target trajectory cannot be found, the second target trajectory causing the first space element to approach the boundary of the element passing region is searched for and determined. The mobile apparatus autonomously approaches the boundary of the passable region in accordance with the second target trajectory determined as a provisional target trajectory, and stops at the position corresponding to the end point of the second target trajectory. That is, the mobile apparatus stays close to the boundary of the movable region to give a moving space to the object. Such movement of the mobile apparatus along the second target trajectory increases the space, making it possible to prompt the object to move through that space. Further, the mobile apparatus can wait in the stopped state at the position corresponding to the end point of the second target trajectory until the object passes through the space and, hence, the possibility of contact with the object lowers. Furthermore, the mobile apparatus is able to restart the movement according to the target trajectory as usual after the possibility of contact with the object further lowers. Accordingly, the mobile apparatus is able to move or act autonomously, while flexibly avoiding contact with the object, in accordance with various situations that change according to the size of the movable region as well as the relative position with the object.

A mobile apparatus according to a second invention is characterized in that, in the mobile apparatus of the first invention, in the state where the mobile apparatus is stopped at the stop position, the second processing unit determines whether a third safety condition is satisfied based on the recognition result by the first processing unit, the third safety condition specifying that the possibility of contact between the first spatial element and the second spatial element has lowered, and on the condition that the second processing unit determines that the third safety condition is satisfied, the third processing unit searches for a new trajectory as the target trajectory based on the recognition result by the first processing unit.

According to the mobile apparatus of the second invention, in the case where the third safety condition is satisfied in the state where the mobile apparatus is stopped at the position corresponding to the end point of the second target trajectory, i.e., in the situation where the possibility of contact of the mobile apparatus with the object has lowered, a new target trajectory is searched for and determined. The mobile apparatus is then able to restart the movement in accordance with the new target trajectory.

A mobile apparatus according to a third invention is characterized in that, in the mobile apparatus of the second invention, the second processing unit determines whether the third safety condition is satisfied, the third safety condition specifying that the second spatial element has moved across a line which passes the end point of the second target trajectory and partitions the element passing region.

According to the mobile apparatus of the third invention, it is determined whether the object has passed by the mobile apparatus stopping at the position corresponding to the end point of the second target trajectory and, hence, the possibility of contact of the mobile apparatus with the object has lowered. In the case where the determination result is positive, a new target trajectory is searched for and determined as described above, allowing the mobile apparatus to restart the movement in accordance with the new target trajectory.

A mobile apparatus according to a fourth invention is characterized in that, in the mobile apparatus of the first invention, the second processing unit determines whether the second safety condition is satisfied, the second safety condition additionally specifying that the possibility of contact of the first spatial element with the second spatial element in the case where the first spatial element moves along the first target trajectory is low.

According to the mobile apparatus of the fourth invention, while the first target trajectory is searched for and determined, in the case where there is a high possibility that the first spatial element moving along the first target trajectory will contact the second spatial element, it is determined that the second safety condition is not satisfied. Thus, the second target trajectory to cause the mobile apparatus to move to increase the movable space for the object is searched for and determined, as described above, in an appropriate situation from the standpoint of surely preventing contact of the mobile apparatus with the object.

A mobile apparatus according to a fifth invention is characterized in that, in the mobile apparatus of the fourth invention, the second processing unit evaluates a distance between the first target trajectory and the expanded second spatial element as a first distance, and in the case where the first distance is greater than a first safety distance, the second processing unit evaluates that the possibility of contact of the first spatial element with the second spatial element in the case where the first spatial element moves along the first target trajectory is low.

According to the mobile apparatus of the fifth invention, the probability of contact of the mobile apparatus recognized as the first spatial element with the object recognized as the second spatial element in the case where the mobile apparatus moves along the first target trajectory is evaluated based on the distance (first distance) between the first target trajectory and the expanded second spatial element in accordance with the changes in position of the object. More specifically, the probability of contact between the mobile apparatus and the object is evaluated based on the amount of the clearance at the time when the mobile apparatus moving along the first target trajectory passes by the object. Accordingly, the second target trajectory to cause the mobile apparatus to move to increase the moving space for the object is searched for and determined, as described above, in an appropriate situation from the standpoint of surely preventing contact between the mobile apparatus and the object.

A mobile apparatus according to a sixth invention is characterized in that, in the mobile apparatus of the fifth invention, the second processing unit evaluates an overlapping area between a first cell centered around a point on the first target trajectory and the element passing region excluding the expanded second spatial element in the model space as the first distance.

According to the mobile apparatus of the sixth invention, the distance (first distance) at the time when the mobile apparatus moving along the first target trajectory passes by the object in the passable region can readily be evaluated as the overlapping area between the first cell centered around a point on the first target trajectory and the element passing region except the expanded second spatial element in the model space.

A mobile apparatus according to a seventh invention is characterized in that, in the mobile apparatus of the fourth invention, in the case where a line extended from the second spatial element based on the changes in the second position does not intersect the first target trajectory searched for and determined by the third processing unit, the second processing unit evaluates that the possibility of contact of the first spatial element with the second spatial element in the case where the first spatial element moves along the first target trajectory is low.

According to the mobile apparatus of the seventh invention, the probability of contact of the mobile apparatus recognized as the first spatial element with the object recognized as the second spatial element in the case where the mobile apparatus moves along the first target trajectory may be determined as appropriate taking into consideration the first target trajectory as a candidate of the target trajectory of the mobile apparatus as well as the changes in position of the object recognized as the second spatial element in the model space. Accordingly, the second target trajectory to cause the mobile apparatus to move to increase the moving space for the object is searched for and determined, as described above, in an appropriate situation from the standpoint of surely preventing contact between the mobile apparatus and the object.

A mobile apparatus according to an eighth invention is characterized in that, in the mobile apparatus of the first invention, the first processing unit recognizes the first spatial element continuously or intermittently expanded in accordance with the changes in the first position as an expanded first spatial element, the third processing unit searches for a trajectory allowing the second spatial element to avoid contact with the expanded first spatial element in the element passing region as a predicted trajectory based on the recognition result by the first processing unit, and the second processing unit determines whether the second safety condition is satisfied, the second safety condition additionally specifying that the predicted trajectory has been searched for and determined by the third processing unit.

According to the mobile apparatus of the eighth invention, it is possible to appropriately determine whether the second safety condition is satisfied, taking into consideration the changes in position of the mobile apparatus recognized as the first spatial element in the model space as well as the predicted trajectory of the object recognized as the second spatial element in the model space. This allows the mobile apparatus to autonomously approach the boundary of the passable region in the situation where it is highly required that the mobile apparatus approach the boundary in order to avoid contact with the object. The mobile apparatus is then able to wait in the stopped state at the position corresponding to the end point of the second target trajectory until the possibility of contact with the object further lowers. Accordingly, the mobile apparatus is able to move or act autonomously, while flexibly avoiding contact with the object, in accordance with various situations.

A mobile apparatus according to a ninth invention is characterized in that, in the mobile apparatus of the eighth invention, the second processing unit determines whether the second safety condition is satisfied, the second safety condition additionally specifying that the possibility of contact of the second spatial element with the first spatial element in the case where the second spatial element moves along the predicted trajectory is low.

According to the mobile apparatus of the ninth invention, while the predicted trajectory is searched for and determined, in the case where there is a high possibility that the second spatial element moving along the predicted trajectory will contact the first spatial element, it is determined that the second safety condition is not satisfied. Accordingly, the second target trajectory causing the first spatial element to approach the boundary of the element passing region is searched for and determined, as described above, in an appropriate situation from the standpoint of surely avoiding contact between the mobile apparatus and the object. The mobile apparatus is thus capable of moving or acting autonomously, while flexibly avoiding contact with the object, in accordance with various situations that change according to the size of the movable region, the relative position with the object, and the like.

A mobile apparatus according to a tenth invention is characterized in that, in the mobile apparatus of the ninth invention, the second processing unit evaluates a distance between the predicted trajectory and the expanded first spatial element as a second distance, and in the case where the second distance is greater than a second safety distance, the second processing unit evaluates that the possibility of contact of the second spatial element with the first spatial element in the case where the second spatial element moves along the predicted trajectory is low.

According to the mobile apparatus of the tenth invention, the probability of contact of the object recognized as the second spatial element with the mobile apparatus recognized as the first spatial element when the object moves along the predicted trajectory is evaluated based on the amount of the distance (second distance) between the predicted trajectory and the expanded first spatial element corresponding to the changes in position of the mobile apparatus. That is, the probability of contact between the object and the mobile apparatus is evaluated based on the amount of the clearance when the object moving along the predicted trajectory passes by the mobile apparatus. Accordingly, the second target trajectory to cause the mobile apparatus to move to increase the moving space for the object is searched for and determined, as described above, in an appropriate situation from the standpoint of surely avoiding contact between the mobile apparatus and the object.

A mobile apparatus according to an eleventh invention is characterized in that, in the mobile apparatus of the tenth invention, the second processing unit evaluates an overlapping area between a second cell centered around a point on the predicted trajectory and the element passing region excluding the expanded first spatial element in the model space as the second distance.

According to the mobile apparatus of the eleventh invention, the distance (second distance) at the time when the object moving along the predicted trajectory passes by the mobile apparatus in its passable region can readily be evaluated as the overlapping area between the second cell centered around a point on the predicted trajectory and the element passing region excluding the expanded first spatial element in the model space.

A mobile apparatus according to a twelfth invention is characterized in that, in the mobile apparatus of the ninth invention, in the case where the first target trajectory does not intersect the predicted trajectory, the second processing unit evaluates that the possibility of contact of the second spatial element with the first spatial element in the case where the second spatial element moves along the predicted trajectory is low.

According to the mobile apparatus of the twelfth invention, in the case where the mobile apparatus recognized as the first spatial element moves along the first target trajectory and the object recognized as the second spatial element moves along the predicted trajectory, the probability of contact between the mobile apparatus and the object is evaluated based on presence/absence of the crossing point of the trajectories. Accordingly, the second target trajectory for causing the mobile apparatus to move to increase the movable space for the object is searched for and determined, as described above, in an appropriate situation from the standpoint of surely avoiding contact between the mobile apparatus and the object.

A mobile apparatus according to a thirteenth invention is characterized in that, in the mobile apparatus of the eighth invention, the third processing unit preferentially searches for a trajectory causing the first spatial element to move away from the predicted trajectory as the second target trajectory.

According to the mobile apparatus of the thirteenth invention, it is possible to prevent the undesirable situation where the mobile apparatus moving along the second target trajectory crosses the front or the traveling direction of the object. Further, the mobile apparatus can wait, in the stopped state at the position away from the trajectory along which the object is expected to move, until the possibility of contact with the object further lowers. Accordingly, the mobile apparatus is capable of moving or acting autonomously, while flexibly avoiding contact with the object, in accordance with various situations.

A mobile apparatus according to a fourteenth invention is characterized in that, in the mobile apparatus of the first invention, the third processing unit evaluates a distance between the first spatial element and a boundary of the element passing region as a third distance, and searches for the second target trajectory to cause the first spatial element to move preferentially in a direction in which the third distance is small.

According to the mobile apparatus of the fourteenth invention, the distance of movement of the mobile apparatus to avoid contact with the object can be restricted to a minimum. This allows the mobile apparatus to stop at the position corresponding to the end point of the second target trajectory without delay after moving along the second target trajectory, to wait until the possibility of contact with the object further lowers.

A mobile apparatus according to a fifteenth invention is characterized in that, in the mobile apparatus of the fourteenth invention, the third processing unit evaluates an overlapping area between a third cell arranged around the first spatial element and the element passing region in the model space as the third distance.

According to the mobile apparatus of the fifteenth invention, the distance from the mobile apparatus to the boundary of the passable region in a respective direction can readily be evaluated as the overlapping area between the corresponding one of the third cells arranged around the first spatial element and the element passing region in the model space.

A mobile apparatus according to a sixteenth invention is characterized in that, in the mobile apparatus of the first invention, the third processing unit searches for the second target trajectory to cause the first spatial element to move away from the second spatial element present in front of the first spatial element.

According to the mobile apparatus of the sixteenth invention, the mobile apparatus moves directly or diagonally backward so that the velocity has a backward component. This further decreases the possibility of contact with the object present in front. Then, the mobile apparatus can wait in the stopped state at the position corresponding to the end point of the second target trajectory until the possibility of contact with the object further decreases.

A mobile apparatus according to a seventeenth invention is characterized in that, in the mobile apparatus of the first invention, the control device controls the operation of the mobile apparatus such that a change in orientation of the mobile apparatus before and after the movement of the mobile apparatus along the second target trajectory is restricted to a minimum.

According to the mobile apparatus of the seventeenth invention, the mobile apparatus can move along the second target trajectory, with the least possible change in orientation or posture. For example, in the case where the mobile apparatus that was moving forward along the target trajectory is about to move diagonally backward in accordance with the second target trajectory, the operation of the mobile apparatus is controlled such that it move with its back facing the traveling direction. This allows the mobile apparatus to smoothly restart its movement in accordance with the target trajectory, without a large change in its orientation or posture.

A mobile apparatus according to an eighteenth invention is characterized in that, in the mobile apparatus of the first invention, on the condition that the control device causes the mobile apparatus to move along the second target trajectory, the control device controls the operation of the mobile apparatus to output a voice or a signal, or make a motion, to indicate that the mobile apparatus has given way to the object.

According to the mobile apparatus of the eighteenth invention, in addition to the movement of the mobile apparatus along the second target trajectory to increase the moving space for the object as described above, the output of the voice or signal indicating that the mobile apparatus has given way and/or the motion indicating the same can further prompt the object to move through the space.

A control program according to a nineteenth invention is characterized by causing a computer mounted on a mobile apparatus to function as the control device of the first invention.

According to the control program of the nineteenth invention, it is possible to cause the computer mounted on the mobile apparatus to function as the device which controls the operation of the mobile apparatus to move or act autonomously while flexibly preventing contact with an object in accordance with various situations.

DESCRIPTION OF THE PREFERRED EMBODIMENTS

Figure 1:
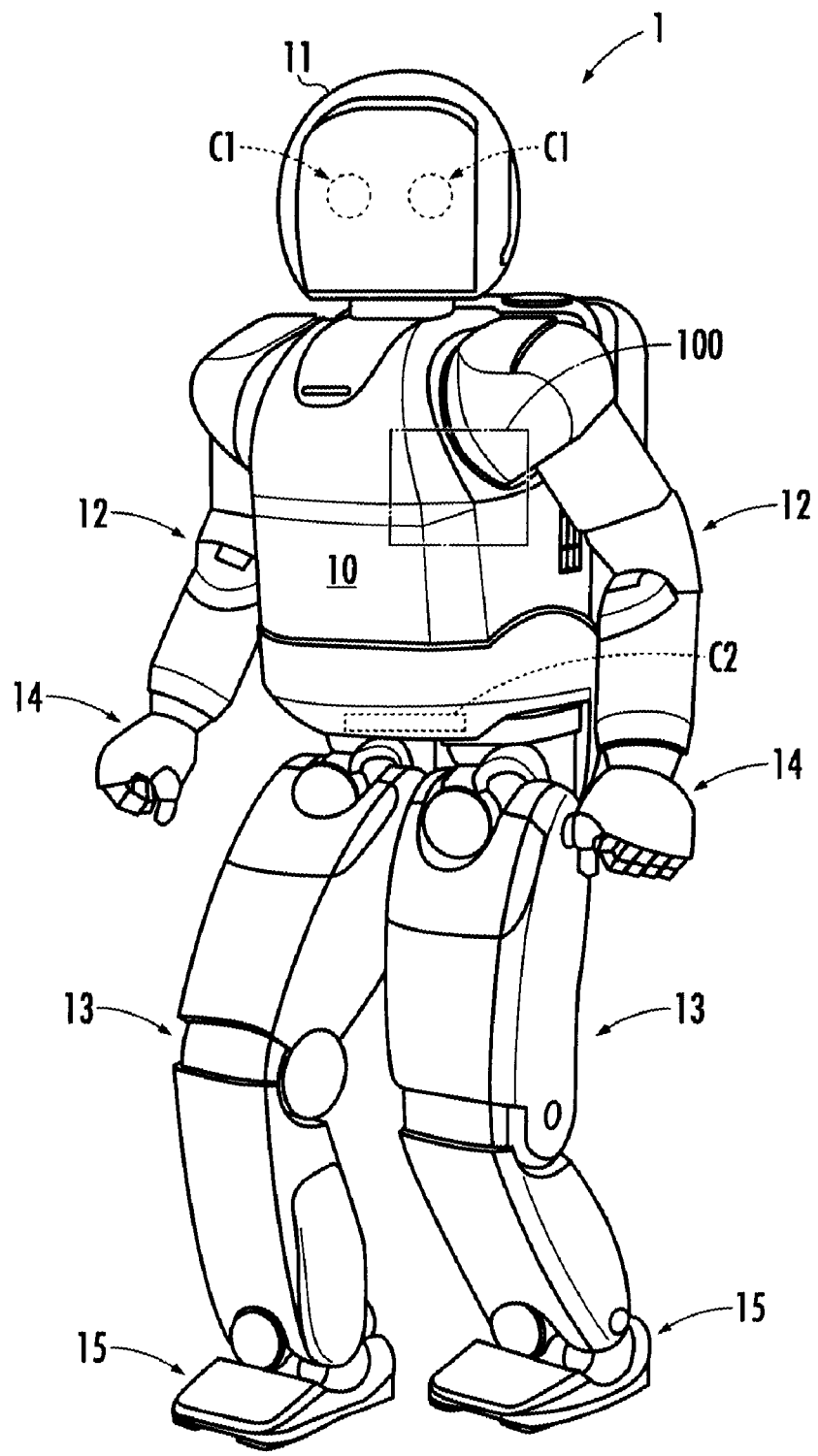
FIG. 1 illustrates the configuration of a robot as an embodiment of the mobile apparatus of the present invention.

Embodiments of the mobile apparatus and others of the present invention will now be described with reference to the drawings. A legged mobile robot (mobile apparatus) 1 shown in FIG. 1 includes: a body 10, a head 11 provided on top of the body 10, left and right arms 12 extended from the respective sides of the body 10, a hand 14 provided at an end of each of the arms 12, left and right legs 13 extended downward from a lower part of the body 10, and a foot 15 provided at an end of each of the legs 13. The robot 1 is capable of bending and stretching the arms 12 and the legs 13 at a plurality of joint portions corresponding to the joints of a human being, such as shoulder, elbow, carpal, hip, knee, and ankle joints, by the forces transmitted from actuators 1000 (see FIG. 2), as disclosed in Japanese Re-Publications of PCT International Publications Nos. 03/090978 and 03/090979. The robot 1 can autonomously move with the left and right legs 13 (or the feet 15) repeatedly taking off and landing on the floor. The height of the head 11 may be adjusted through adjustment of the tilt angle of the body 10 with respect to the vertical direction. The head 11 is mounted with a pair of head cameras (CCD cameras) C1 arranged side by side to face forward of the robot 1. The body 10 is mounted with a waist camera (infrared camera) C2 in front at the lower part. It is noted that the mobile apparatus is not restricted to the robot 1 which autonomously moves with the movements of the legs 13, but may be a wheeled mobile robot (vehicle) or any other apparatus having the locomotive function.

The robot 1 includes a control device 100 which is configured with an ECU or a computer (made up of CPU, ROM, RAM, I/O and others) serving as hardware. The computer has a memory having a "control program" of the present invention stored therein. While the control program may be installed to the computer via a software recording medium such as a CD or a DVD, it may be downloaded to the computer via a network or an artificial satellite by a server in response to a request signal transmitted from the robot 1 to the server.

Figure 2:
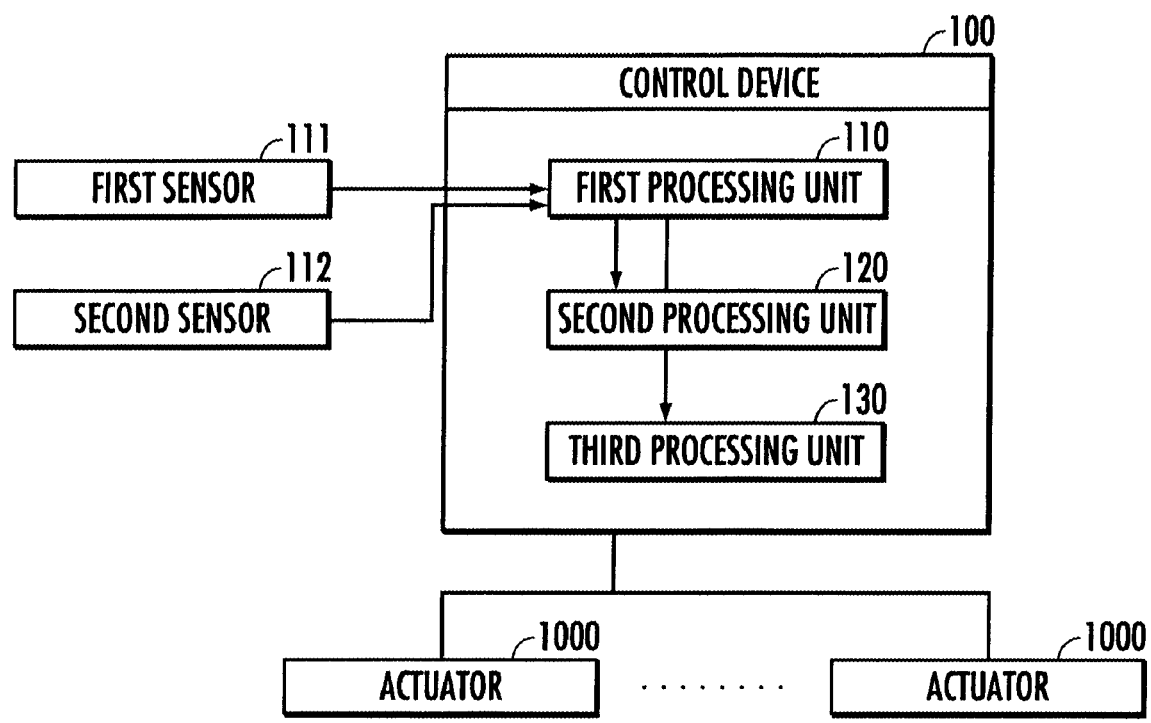
FIG. 2 illustrates the configuration of a control device of the robot.

The control device 100 shown in FIG. 2 controls operations of the actuators 1000 based on the signals output from a first sensor 111 and a second sensor 112 to control the operations of the arms 12 and the legs 13. The first sensor 111 is for measuring the behavioral state of the robot 1. Various sensors mounted on the robot 1 correspond to the first sensor 111, which include a gyro sensor that outputs a signal responsive to the acceleration of the body 10, a rotary encoder that outputs a signal responsive to the joint angle of each joint, and a force sensor that outputs a signal responsive to the floor reaction force acting on the legs 13. The second sensor 112 is for measuring the environment of the robot 1, including the behavioral state of an object. The head cameras C1 and the waist camera C2 correspond to the second sensor 112. The actuator 1000 includes a driving source such as an electric motor, a speed reducer provided between the output shaft of the driving source and a link constituting the arm 12 or the leg 13, and a flexible element such as an elastic member.

The control device 100 includes a first processing unit 110, a second processing unit 120, and a third processing unit 130. As used herein, that the component of the present invention "recognizes" the information means that the component performs every kind of information processing, such as searching a database for the information, reading the information from a storage device such as a memory, measuring, calculating, estimating, and determining the information based on the output signals of the sensors and the like, and storing the information obtained by measurement or the like in a memory, which is necessary for the information to be prepared or ready for further information processing.

The first processing unit 110 recognizes the region through which the robot 1 is passable as an element passing region QS in a two-dimensional model space. The first processing unit 110 recognizes the robot 1 and a trajectory representing the changes (or change pattern) in position of the robot 1 as a first spatial element $Q_1$ and a first trajectory $P_1(t)$ representing the changes in a first position $p_1$, i.e. how the first position $p_1$ has changed over time, respectively, in the element passing region QS, based on the output signals from the first sensor 111 and the like. Further, the first processing unit 110 recognizes an object 2 and a trajectory representing the changes in position of the object 2 as a second spatial element $Q_2$ and a second trajectory $P_2(t)$ representing the changes in a second position $p_2$, i.e. how the second position $p_2$ has changed over time, respectively, in the element passing region QS, based on the output signals from the second sensor 112 and the like. The first processing unit 110 recognizes the first spatial element $Q_1$ expanded continuously or intermittently in accordance with the changes in the first position $p_1$ as an expanded first spatial element $EQ_1$. Further, the first processing unit 110 recognizes the second spatial element $Q_2$ expanded continuously or intermittently in accordance with the changes in the second position $p_2$ as an expanded second spatial element $EQ_2$. As used herein, the "spatial element" refers to the "point" for which its position, velocity, acceleration, and other states in the model space can be defined, the "line segment" for which its shape, length, and other states in addition to the position and the like in the model space can be defined, the "region" for which its shape, area, and other states in addition to the position and the like in the model space can be defined, and the like.

The second processing unit 120 determines whether a "first safety condition" specifying that the possibility of contact of the first spatial element $Q_1$ with the second spatial element $Q_2$ in the element passing region QS is low is satisfied, based on the recognition result (more accurately, a necessary part thereof) by the first processing unit 110. The second processing unit 120 determines whether a "second safety condition" primarily specifying that a first target trajectory $R_1$, which will be described later, has been searched for and determined by the third processing unit 130 is satisfied, based on the recognition result by the first processing unit 110. In the state where the robot 1 stops at the position corresponding to the end point of a second target trajectory $R_2$, which will be described later, the second processing unit 120 determines whether a "third safety condition" specifying that the possibility of contact of the first spatial element $Q_1$ with the second spatial element $Q_2$ has lowered is satisfied, based on the recognition result by the first processing unit 110.

On the condition that the second processing unit 120 determines that the "first safety condition" is not satisfied, the third processing unit 130 searches for the first target trajectory $R_1$ which allows the first spatial element $Q_1$ to avoid contact with the expanded second spatial element $EQ_2$ in the element passing region QS, based on the recognition result by the first processing unit 110. On the condition that the second processing unit 120 determines that the "second safety condition" is not satisfied, the third processing unit 130 searches for the second target trajectory $R_2$ which causes the first spatial element $Q_1$ to approach the boundary of the element passing region QS, based on the recognition result by the first processing unit 110. On the condition that the second processing unit 120 determines that the "third safety condition" is satisfied, the third processing unit 130 searches for a new target trajectory $R_0$ based on the recognition result by the first processing unit 110.

The control device 100 controls the operation of the robot 1 such that it moves along a target trajectory $R_0$ which is defined in advance, or searched for and determined or set by the third processing unit 130, in the model space. In the case where the second processing unit 120 determines that the second safety condition is satisfied, the control device 100 controls the operation of the robot 1 such that it moves with the first target trajectory $R_1$ as the target trajectory $R_0$. In the case where the second target trajectory $R_2$ has been searched for and determined by the third processing unit 130, the control device 100 controls the operation of the robot 1 such that it moves and acts with the second target trajectory $R_2$ as a provisional target trajectory $R_0$ and with the position corresponding to the end point of the second target trajectory $R_2$ as a stop position.

Figure 6:
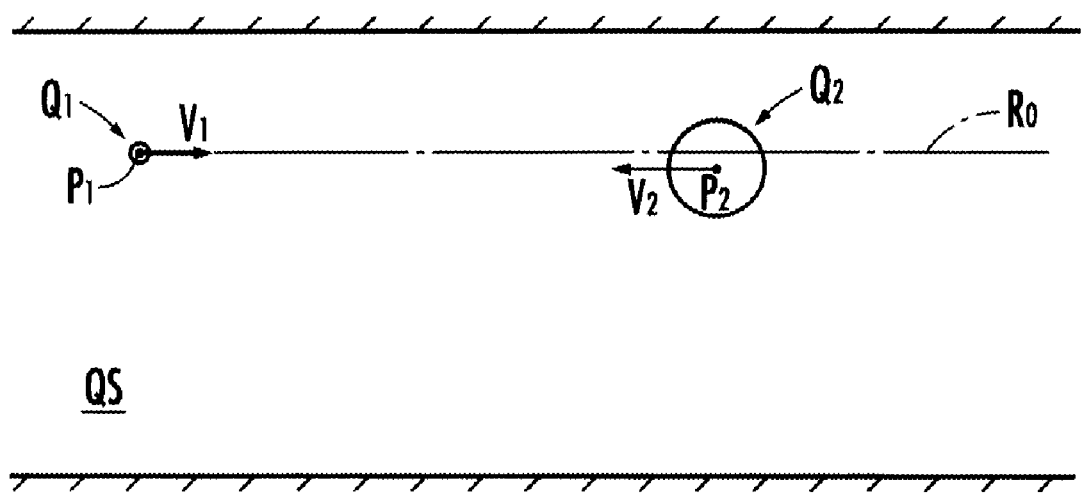
FIG. 6 illustrates a method of determining whether a first safety condition is satisfied.

The functions of the robot having the above-described configuration will now be described. The first processing unit 110 reads from a memory, or accesses an external database to search for, a passable region of the robot 1 as a two-dimensional element passing region QS (S010 in FIG. 3). As a result, the element passing region QS of the shape as shown in FIG. 6(a), corresponding to the shapes of the passage wall and fixed objects for example, is recognized. In the case where the first spatial element $Q_1$ or the second spatial element $Q_2$ is recognized as a Minkowski sum of a first region $q_1$ and a second region $q_2$ having the sizes corresponding to the sizes of the robot 1 and the object 2, respectively, as will be described later, the element passing region QS is recognized as a Minkowski difference between the region having the size corresponding to the size of the passable region and the first or second region $q_1$ or $q_2$. While the element passing region QS may be defined as a flat or curved surface having an arbitrary point specified by the latitude and longitude, it may be changed sequentially based on the shapes of the surroundings of the robot 1 recognized based on the images obtained through the head cameras C1, including the tilt angle of the floor face, and presence/absence of steps or irregularities.

Figure 3:
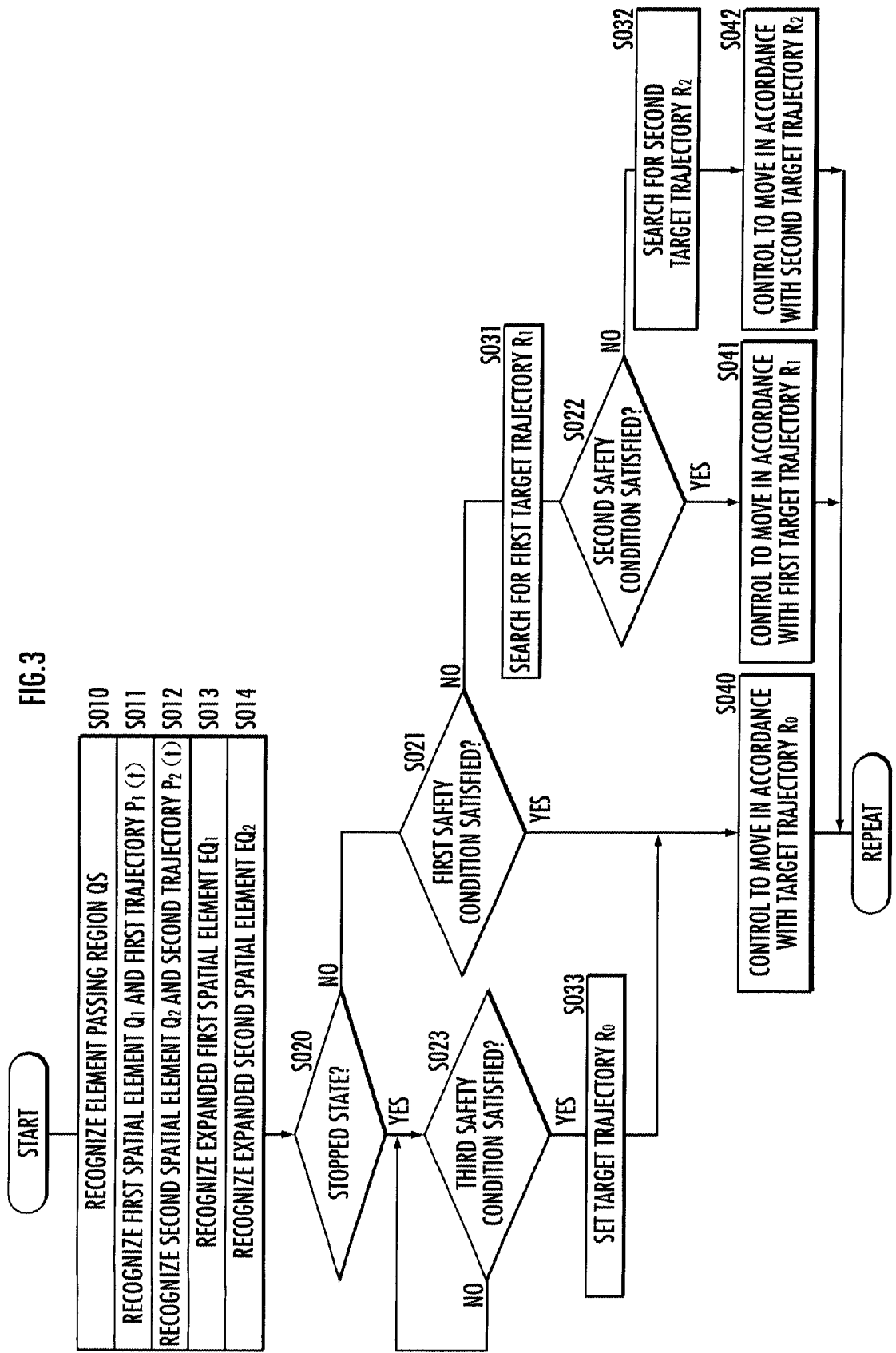
FIG. 3 illustrates a method of controlling the operation of the robot.
Figure 4:
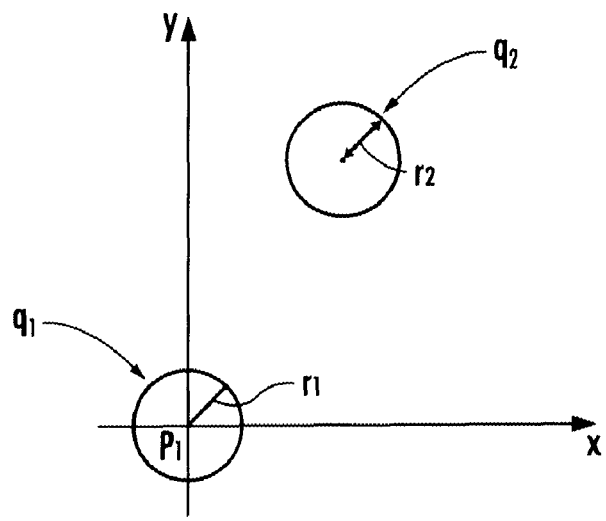
FIG. 4 illustrates results of recognition of first and second spatial elements.
Figure 4:
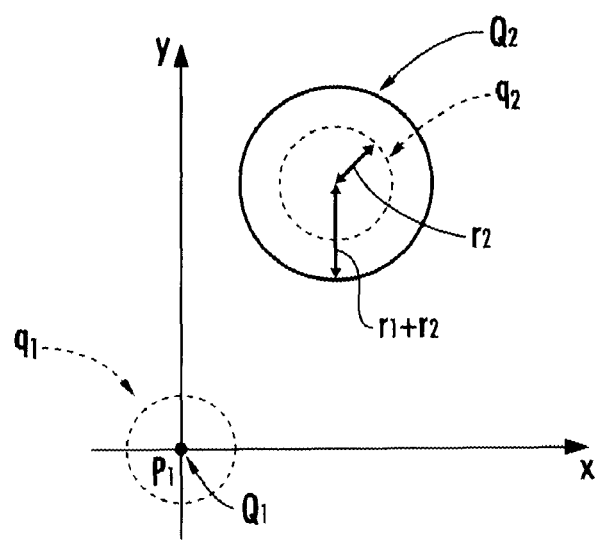

The first processing unit 110 recognizes the robot 1 and the trajectory representing the changes in its position as the first spatial element $Q_1$ and the first trajectory $P_1(t)$ representing the changes in the first position $p_1$, respectively, in the element passing region QS, based on the output signals from the first sensor 111 and the like (S011 in FIG. 3). The shape and size of the first spatial element $Q_1$ are read from a memory or a database. Although the first region $q_1$ shown in FIG. 4(a) having the size corresponding to the size of the robot 1 may be recognized as the first spatial element $Q_1$ without modification, in the present embodiment, the first region $q_1$ reduced into a point as shown in FIG. 4(b) is recognized as the first spatial element $Q_1$. This can reduce the amount of operations required to search for the trajectory which the robot 1 should follow. In the case where an object such as a box held in the arms 12 of the robot 1 or a device optionally attached to the body 10 to add a function to the robot 1 moves with the robot 1 in an integrated manner, the shapes and sizes of the robot 1 and the object which move in a piece may collectively be recognized as the shape and size of the robot 1. The position of the robot 1 is measured based on the signals representing the latitude and longitude (or coordinates in a fixed system of coordinates) obtained through its GPS function, the signals representing the acceleration of the robot 1 which are output sequentially from a gyro sensor, or the signals representing the joint angles of the legs 13 and others which are output from a rotary encoder, using an inverse dynamic model as required. The velocity (first velocity) $v_1$ of the first spatial element $Q_1$, and its acceleration (first acceleration) $\alpha_1$ when necessary, may be calculated based on the changes in or temporal differentiation of the first position $p_1$.

The first processing unit 110 recognizes the object 2 and the trajectory representing the changes in its position as the second spatial element $Q_2$ and the second trajectory $P_2(t)$ representing the changes in the second position $p_2$, respectively, in the element passing region QS, based on the output signals from the second sensor 112 and the like (S012 in FIG. 3). The shape and size of the second spatial element $Q_2$ may be recognized, after the type of the object 2 is determined based on the images of the object 2 picked up by the head cameras C1, by searching a memory (storing a table showing correspondences between the types, shapes, and sizes of objects) based on the determined result. Although the second region $q_2$ shown in FIG. 4(a) having the size corresponding to that of the object 2 may be recognized as the second spatial element $Q_2$ without modification, in the present embodiment, the Minkowski sum of the first and second regions $q_1$ and $q_2$ as shown in FIG. 4(b) is recognized as the second spatial element $Q_2$. The position of the object 2 may be measured based on the images of the object 2 picked up by the head cameras C1 and the waist camera C2. The velocity (second velocity) $v_2$ of the second spatial element $Q_2$, and its acceleration (second acceleration) $\alpha_2$ when necessary, may be calculated based on the changes in or temporal differentiation of the second position $p_2$.

Figure 5:
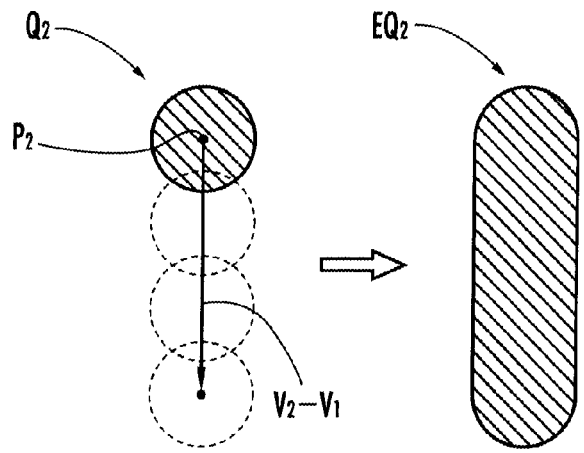
FIG. 5 illustrates results of recognition of an expanded second spatial element.
Figure 5:
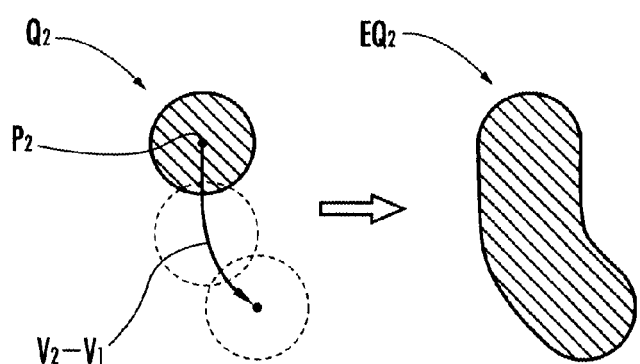
Figure 5:
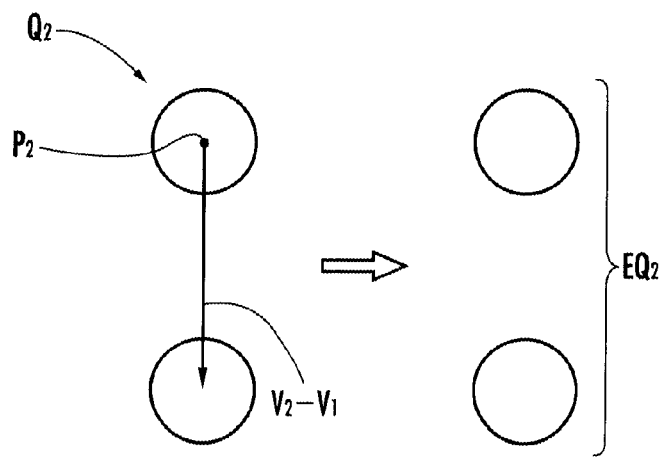

The first processing unit 110 recognizes the first spatial element $Q_1$ continuously or intermittently expanded in accordance with the changes in the first position $p_1$ as an expanded first spatial element $EQ_1$ (S013 in FIG. 3). The first processing unit 110 recognizes the second spatial element $Q_2$ continuously or intermittently expanded in accordance with the changes in the second position $p_2$ as an expanded second spatial element $EQ_2$ (S014 in FIG. 3). For example, the second spatial element $Q_2$ continuously enlarged in the direction of the second velocity vector $v_2$ is recognized as a straight band-shaped expanded second spatial element $EQ_2$, as shown in FIG. 5(a) on the right side. The variable k representing the degree of enlargement of the second spatial element $Q_2$ is expressed by the following expression (1), based on the first position vector $p_1$, the second position vector $p_2$, the first velocity vector $v_1$, and the second velocity vector $v_2$.

$$k=|p_2-p_1||v_2|/|v_2-v_1| \quad (1)$$

Further, the second spatial element $Q_2$ continuously enlarged so as to turn around in accordance with the second velocity vector $v_2$ (or the second acceleration vector $\alpha_2$) is recognized as a bent band-shaped expanded second spatial element $EQ_2$, as shown in FIG. 5(b) on the right side. It is noted that the second spatial element $Q_2$ intermittently enlarged in the direction corresponding to the second velocity vector $v_2$ may also be recognized as the expanded second spatial element $EQ_2$ made up of a plurality of spatial elements, as shown in FIG. 5(c) on the right side. While the expanded first spatial element $EQ_1$ is recognized in a similar manner, in the case of recognition of the expanded first spatial element $EQ_1$, conversely from the case of recognition of the expanded second spatial element $EQ_2$, the Minkowski sum of the first and second regions $q_1$ and $q_2$ is recognized as the first spatial element $Q_1$, and the second region $q_2$ reduced into a point is recognized as the second spatial element $Q_2$. The expanded first spatial element $EQ_1$ and the expanded second spatial element $EQ_2$ are used for the trajectory search by the third processing unit 130 and for the determination of condition fulfillment by the second processing unit 120, as will be described later, and therefore, they may be recognized only occasionally when required by the trajectory search and the like.

The second processing unit 120 determines whether the robot 1 is stopped at the position corresponding to the end point of the second target trajectory $R_2$, which will be described later, based on the recognition result (more accurately, a necessary part thereof; the same applies hereinafter) by the first processing unit 110 (S020 in FIG. 3). When determining that the robot 1 is not in the stopped state (NO in S020 in FIG. 3), the second processing unit 120 determines whether the "first safety condition" specifying that the possibility of contact of the first spatial element $Q_1$ with the second spatial element $Q_2$ in the element passing region QS is low is satisfied, based on the recognition result by the first processing unit 110 (S021 in FIG. 3). Specifically, the first safety condition is set such that the target trajectory $R_0$ of the first spatial element $Q_1$ defined in the element passing region QS does not intersect or contact the second spatial element $Q_2$. For example in the situation shown in FIG. 6, the target trajectory $R_0$ of the first spatial element $Q_1$ intersects the second spatial element $Q_2$, and accordingly, it is determined that the first safety condition is not satisfied. It is noted that, in place of or in addition to the condition that "the target trajectory $R_0$ of the first spatial element $Q_1$ does not intersect the second spatial element $Q_2$", the first safety condition may specify that "the distance between the first spatial element $Q_1$ and the second spatial element $Q_2$ is not less than a predetermined distance", or that "the robot 1 has not received or recognized the signal or sign issued by the object which determined that the possibility of contact with the robot 1 is high".

If the second processing unit 120 determines that the first safety condition is satisfied (YES in S021 in FIG. 3), the control device 100 controls the operation of the robot 1 such that it moves along the latest target trajectory $R_0$, without modifying it (S040 in FIG. 3). On the condition that the second processing unit 120 determines that the first safety condition is not satisfied (NO in S021 in FIG. 3), the third processing unit 130 searches for a first target trajectory $R_1$ which allows the first spatial element $Q_1$ to avoid contact with the expanded second spatial element $EQ_2$ in the element passing region QS, based on the recognition result by the first processing unit 110 (S031 in FIG. 3).

The second processing unit 120 determines whether the "second safety condition" primarily specifying that the first target trajectory $R_1$ has been searched for and determined by the third processing unit 130 is satisfied (S022 in FIG. 3). Specifically, the second processing unit 120 determines that the second safety condition is satisfied in the case where all of the following second safety conditions (i) through (iv) are satisfied. If at least one of them is not satisfied, it determines that the second safety condition is not satisfied. Alternatively, it may be determined that the second safety condition is satisfied in the case where one or more of the second safety conditions (i) through (iv), e.g., (i) only; (i) and (ii); (iii) only; or (iii) and (iv), are satisfied.

Figure 7:
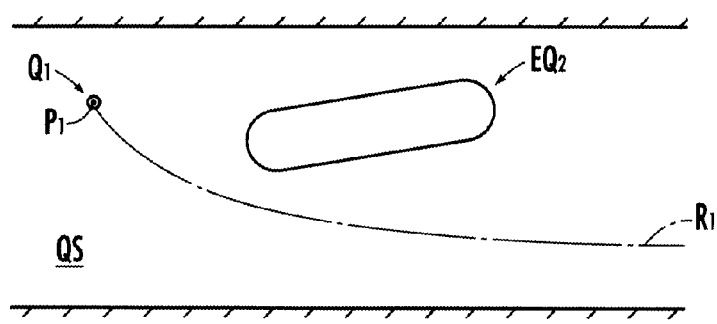
FIGS. 7 and 8 illustrate a method of determining whether a second safety condition is satisfied.
Figure 7:
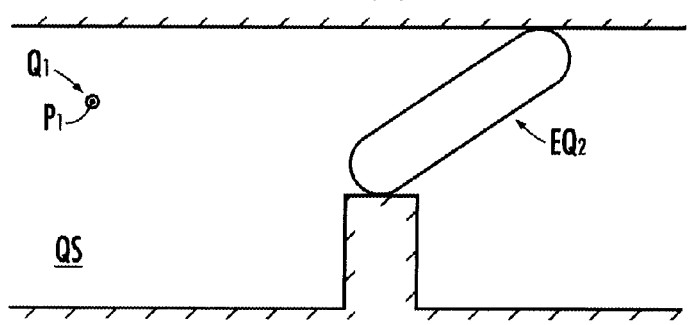
Figure 7:
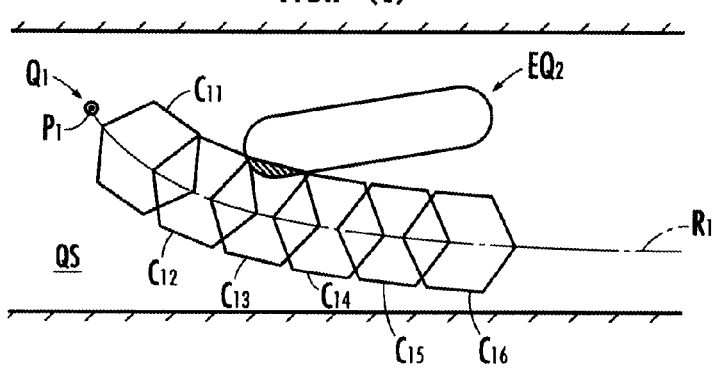
Figure 7:
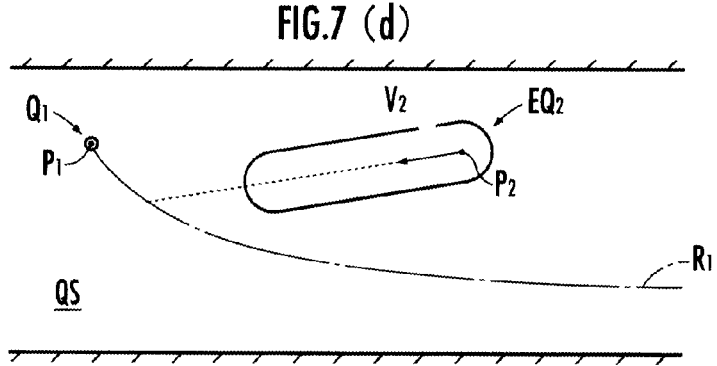

The second safety condition (i) is that "the first target trajectory $R_1$ has been searched for and determined" by the third processing unit 130. For example, in the case where the first target trajectory $R_1$ is set as shown in FIG. 7(*a*), it is determined that the second safety condition (i) is satisfied. In the situation as shown in FIG. 7(*b*) where the first target trajectory $R_1$ cannot be found because the expanded second spatial element $EQ_2$ blocks the element passing region QS ahead of the first spatial element $Q_1$, it is determined that the second safety condition (i) is not satisfied.

The second safety condition (ii) is that "the first spatial element $Q_1$ moving along the first target trajectory $R_1$ is unlikely to contact the second spatial element $Q_2$". Specifically, the second safety condition (ii) is that "the distance (first distance) between the first target trajectory $R_1$ and the expanded second spatial element $EQ_2$ is greater than a first safety distance". For example, first cells $C_{1i}$ ($i=1, 2, \ldots$) of a regular hexagonal shape each having its center (reference point) on the first target trajectory $R_1$ are taken as shown in FIG. 7(*c*), and the overlapping area of a respective first cell $C_{1i}$ with the element passing region QS excluding the part (shaded portion) overlapping the expanded second spatial element $EQ_2$ is evaluated as the first distance by the second processing unit 120. The area is measured according to the Monte Carlo method, for example. Specifically, dots are arranged at random in the element passing region QS, and the number of the dots included in the overlapping region between the first cell $C_{1i}$ and the element passing region QS except the part overlapping the expanded second spatial element $EQ_2$ is counted, and the counted number is measured as the overlapping area. In the case where the first distance is not greater than the first safety distance, there is a high possibility that the first spatial element $Q_1$ will contact the second spatial element $Q_2$ if it moves along the first target trajectory $R_1$. Thus, it is determined that the second safety condition (ii) is not satisfied. It is noted that the first cells $C_{1i}$ shown in FIG. 7(*c*) may be in a circular, rod, or any other shape, and its number is arbitrary. They may or may not overlap each other. Further, the first distance may be evaluated geometrically, for example as the shortest distance between the foot of a perpendicular to the first target trajectory $R_1$ and the crossing point of the perpendicular with the expanded second spatial element $EQ_2$.

Alternatively, in place of or in addition to the condition that "the first distance is greater than the first safety distance", the second safety condition (ii) may specify that "the extension starting at the second position $p_2$ and extended in the direction of the second velocity $v_2$ (representing the changes in the second position $p_2$) does not intersect the first target trajectory $R_1$". For example, in the case where the extension intersects the first target trajectory $R_1$ as shown in FIG. 7(*d*), it is determined that there is a high possibility that the first spatial element $Q_1$ moving along the first target trajectory $R_1$ will contact the second spatial element $Q_2$, and hence, that the second safety condition (ii) is not satisfied.

Figure 8:
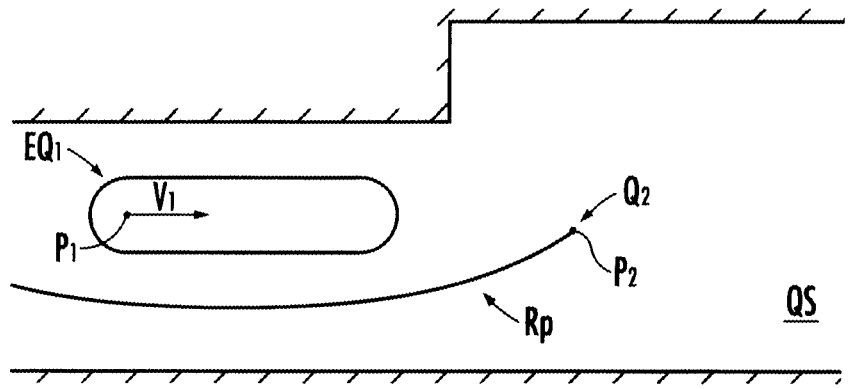
Figure 8:
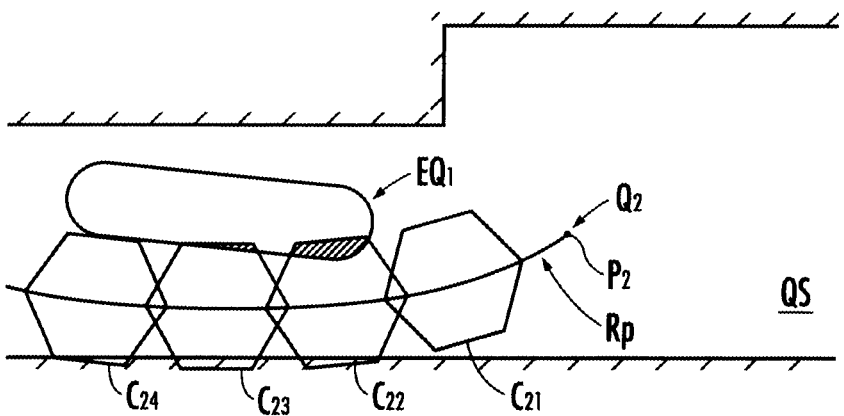
Figure 8:
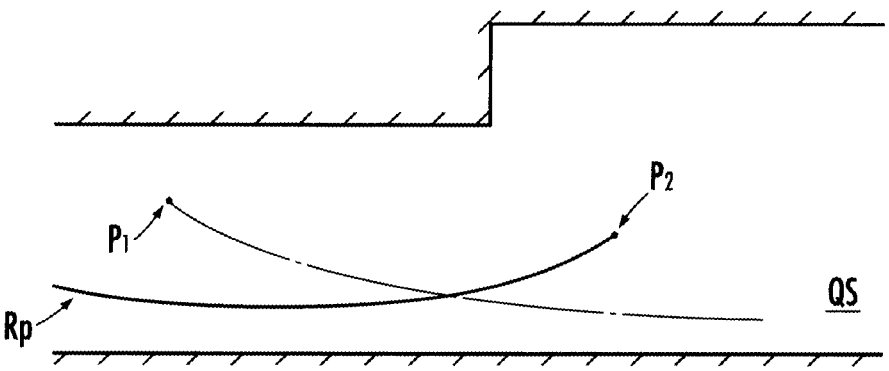

The second safety condition (iii) is that it is possible to search for a predicted trajectory $R_p$ which allows the second spatial element $Q_2$ to avoid contact with the expanded first spatial element $EQ_1$ in the element passing region QS. For example in the case where the predicted trajectory $R_p$ has been searched for and determined as shown in FIG. 8(*a*), it is determined that the second safety condition (iii) is satisfied. For the search of the predicted trajectory $R_p$, the RRT-Connect algorithm or other known techniques may be used.

The second safety condition (iv) is that "the second spatial element $Q_2$ moving along the predicted trajectory $R_p$ is unlikely to contact the first spatial element $Q_1$". Specifically, the second safety condition (iv) is that "the distance (second distance) between the predicted trajectory $R_p$ and the expanded first spatial element $EQ_1$ is greater than a second safety distance". For example, second cells $C_{2i}$ ($i=1, 2, \ldots$) of a regular hexagonal shape each having its center (reference point) on the predicted trajectory $R_p$ as shown in FIG. 8(*b*) are taken, and the overlapping area between a respective second cell $C_{2i}$ and the element passing region QS excluding the part (shaded portion) overlapping the expanded first spatial element $EQ_1$ is evaluated as the second distance by the second processing unit 120, according to the Monte Carlo method or the like. In the case where the second distance is not greater than the second safety distance, it is determined that there is a high possibility that the second spatial element $Q_2$ will contact the first spatial element $Q_1$ if it moves along the predicted trajectory $R_p$, and hence, that the second safety condition (iv) is not satisfied. The second cells $C_{2i}$ shown in FIG. 8(*b*) may be in a circular, rod, or any other shape, and its number is arbitrary. They may or may not overlap each other. Further, the second distance may be evaluated geometrically, for example as the shortest distance between the foot of a perpendicular to the predicted trajectory $R_p$ and the crossing point of the perpendicular with the expanded first spatial element $EQ_1$.

Alternatively, in place of or in addition to the condition that "the second distance is greater than the second safety distance", the second safety condition (iv) may specify that "the first target trajectory $R_1$ does not intersect the predicted trajectory $R_p$". For example, in the case where the first target trajectory $R_1$ intersects the predicted trajectory $R_p$ as shown in FIG. 8(*c*), it is determined that there is a high possibility that the second spatial element $Q_2$ moving along the predicted trajectory $R_p$ will contact the first spatial element $Q_1$, and hence, that the second safety condition (iv) is not satisfied.

Figure 9:
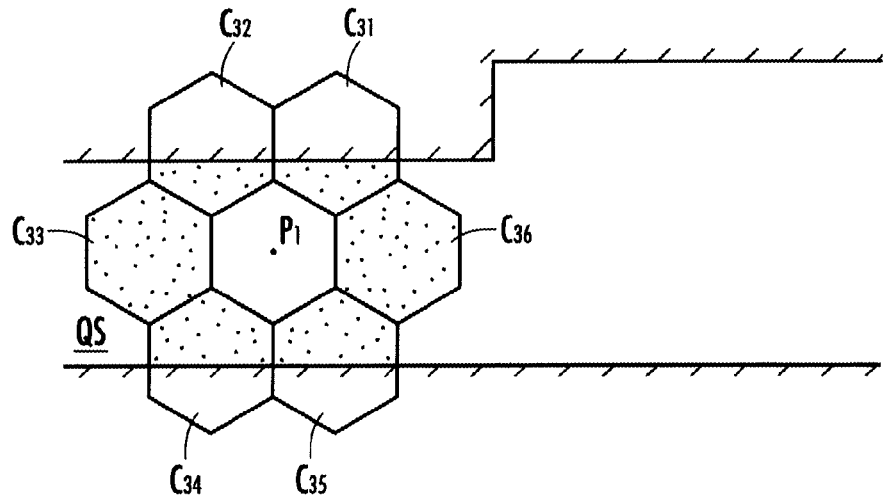
FIG. 9 illustrates a method of determining whether a third safety condition is satisfied and a method of searching for a second target trajectory.
Figure 9:
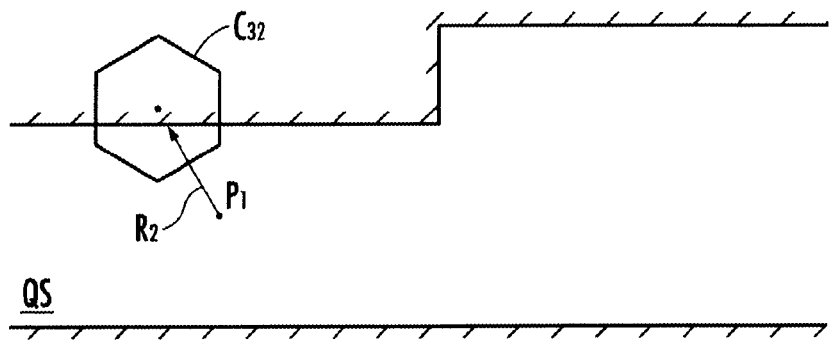
Figure 9:
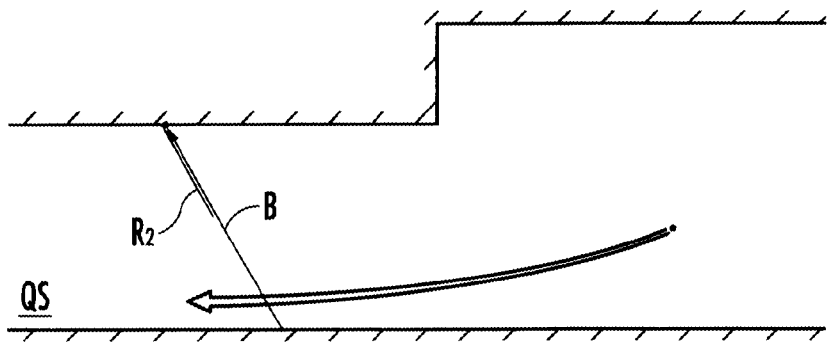

If the second processing unit 120 determines that the second safety condition is satisfied (YES in S022 in FIG. 3), the control device 100 controls the operation of the robot 1 such that it moves with the first target trajectory $R_1$ as the target trajectory $R_0$ (S041 in FIG. 3). On the condition that the second processing unit 120 determines that the second safety condition is not satisfied (NO in S022 in FIG. 3), the third processing unit 130 searches for the second target trajectory $R_2$ which causes the first spatial element $Q_1$ to approach the boundary of the element passing region QS, based on the recognition result by the first processing unit 110 (S032 in FIG. 3). In searching for the second target trajectory $R_2$, with a plurality of directions defined with respect to the first spatial element $Q_1$, the distance to the boundary of the element passing region QS in the respective direction is evaluated as the third distance. The second target trajectory $R_2$ is then set preferentially in the direction with the shortest third distance. In evaluation of the third distance, third cells $C_{3i}$ ($i=1$ to $6$) of a regular hexagonal shape are arranged around the first spatial element $Q_1$ in the model space, as shown in FIG. 9(a). It is noted that the third cells $C_{3i}$ shown in FIG. 9(a) may be in a circular, rod, or any other shape, and its number is arbitrary. They may or may not overlap each other. Then, the overlapping area between the third cell $C_{3i}$ and the element passing region QS is evaluated as the third distance, according to the Monte Carlo method or the like. In the situation shown in FIG. 9(a), it is evaluated that the third distance is the shortest for each of the two cells $C_{31}$ and $C_{32}$. Further, as shown in FIG. 9(b), the line segment extending from the first position $p_1$ to the boundary of the element passing region QS in the direction of the center of the third cell $C_{32}$, out of the cells $C_{31}$ and $C_{32}$ each having the smallest overlapping area, is determined as the second target trajectory $R_2$. The third cell $C_{32}$ is selected such that, with the traveling direction of the first spatial element $Q_1$ heretofore being defined as frontward, the velocity of the first spatial element $Q_1$ moving along the second target trajectory $R_2$ will have a backward component. While the second target trajectory $R_2$ determined in the above-described manner eventually comes away from the predicted trajectory $R_p$ of the second spatial element $Q_2$ (see FIGS. 9(b) and 10(b)), the second target trajectory $R_2$ may be searched for and determined, irrespective of the distance described above, such that it comes away from the predicted trajectory $R_p$.

Figure 10:
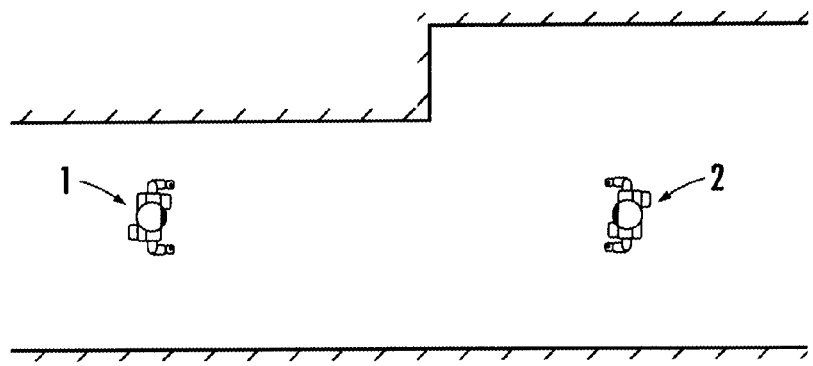
FIG. 10 illustrates how the robot behaves.
Figure 10:
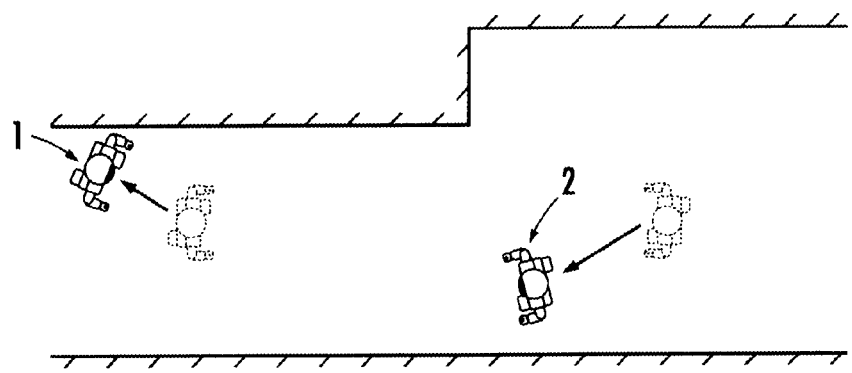
Figure 10:
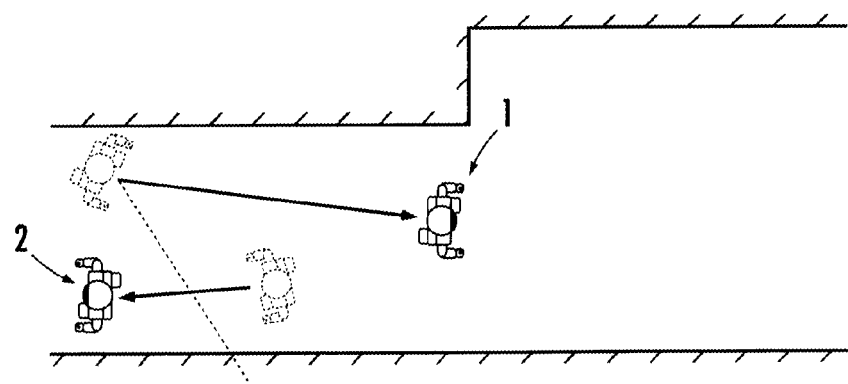

In the case where the second target trajectory $R_2$ has been searched for and determined by the third processing unit 130, the control device 100 controls the operation of the robot 1 such that it moves and acts with the second target trajectory $R_2$ as a provisional target trajectory $R_0$ and with the position corresponding to the end point of the second target trajectory $R_2$ as its stop position (S042 in FIG. 3). At this time, the operation of the robot 1 is controlled such that it moves with its back facing the traveling direction (i.e., it walks backward), as shown in FIG. 10(b). The robot 1 then stops at the position corresponding to the end point of the second target trajectory $R_2$.

In response, the second processing unit 120 determines that the robot 1 is in the stopped state (YES in S020 in FIG. 3), and determines whether the "third safety condition" specifying that the possibility of contact between the first spatial element $Q_1$ and the second spatial element $Q_2$ has lowered is satisfied, based on the recognition result by the first processing unit 110 (S023 in FIG. 3). Specifically, with the third safety condition being set such that the second spatial element $Q_2$ has moved across a line B which passes the end point of the second target trajectory $R_2$ and partitions the element passing region QS, as shown in FIG. 9(c), it is determined whether the condition is satisfied. The partition line B may be set to include a whole of the second target trajectory $R_2$ as shown in FIG. 9(c), or to include only a part thereof. Still alternatively, it may be set regardless of the second target trajectory $R_2$, as long as it is set near the position corresponding to the stop position of the robot 1. As the third safety condition, besides the condition that the second spatial element $Q_2$ has crossed the partition line B of the element passing region QS, the following conditions may also be adapted: the condition that more than a predetermined period of time has passed in the state where the robot 1 is stopped without being confirmed that the second spatial element $Q_2$ has crossed the partition line B of the element passing region QS; and the condition that it has been confirmed that the second spatial element $Q_2$ representing the object 2 the contact with which should be avoided has moved away from the first spatial element $Q_1$.

On the condition that the second processing unit 120 determines that the third safety condition is satisfied (YES in S023 in FIG. 3), the third processing unit 130 searches for and determines a new target trajectory $R_0$ based on the recognition result by the first processing unit 110 (S033 in FIG. 3). The control device 100 then controls the operation of the robot 1 such that it moves along the latest target trajectory $R_0$ (S040 in FIG. 3). This allows the robot 1 to restart its movement after the object 2 passes in front of the robot 1, as shown in FIG. 10(c).

According to the robot 1 exerting the above-described functions, in the case where the first safety condition is not satisfied, i.e., if there is a high possibility of contact between the robot 1 and the object 2, the first target trajectory $R_1$ allowing the first spatial element $Q_1$ to avoid contact with the expanded second spatial element $EQ_2$ in the model space is searched for and determined (see S021 and S031 in FIG. 3, and FIG. 7(a)). The robot 1 autonomously moving along the first target trajectory $R_1$ determined as the target trajectory $R_0$ can avoid contact with the object 2 (see S041 in FIG. 3 and FIG. 7(a)).

Further, even if the first safety condition is satisfied, if the second safety condition is not satisfied, i.e., in the case where the first target trajectory $R_1$ cannot be found, the second target trajectory $R_2$ causing the first spatial element $Q_1$ to approach the boundary of the element passing region QS is searched for and determined (see S022 and S032 in FIG. 3, and FIG. 9(b)). The robot 1 autonomously approaches the boundary of the element passing region in accordance with the second target trajectory $R_2$ determined as a provisional target trajectory $R_0$, and stops at the position corresponding to the end point of the second target trajectory $R_2$ (see S042 in FIG. 3 and FIG. 9(c)). That is, the robot 1 acts to stay close to the boundary of the movable region, to give a moving space to the object 2. The robot 1 moving along the second target trajectory $R_2$ increases the space, which can prompt the object 2 to move through that space (see FIG. 10(b)).

Further, it is possible to avoid the undesirable situation where the robot 1 moving along the second target trajectory $R_2$ crosses the front or the traveling direction of the object. Furthermore, the robot 1 can wait, in the stopped state at the position corresponding to the end point of the second target trajectory $R_2$, until fulfillment of the third safety condition that the possibility of contact with the object 2 has lowered as the object 2 passed through the space or the like (see S020 and S023 in FIG. 3, and FIG. 10(b)). Still further, in the case where the third safety condition is satisfied, i.e., after the possibility of contact with the object 2 has further lowered, the robot 1 is able to restart the movement along the target trajectory $R_0$ as usual (see S033 and S040 in FIG. 3, and FIG. 10(c)). Accordingly, the robot 1 is able to move or act autonomously while flexibly avoiding contact with the object 2 in accordance with the various situations that change due to the size of the movable region as well as the relative position with the object 2.

The trajectory causing the first spatial element $Q_1$ to move away from the predicted trajectory $R_p$ of the second spatial element $Q_2$ is searched for and determined preferentially as the second target trajectory $R_2$. This allows the robot 1 to wait, in the stopped state at the position away from the trajectory along which the object 2 is expected to move, until the possibility of contact with the object 2 lowers (see FIGS. 9(c) and 10(b)).

Further, the second target trajectory $R_2$ is searched for and determined preferentially in the direction where the distance between the first spatial element $Q_1$ and the boundary of the element passing region QS is small. This allows the robot 1 to move in the shortest possible distance required to avoid contact with the object 2 (see FIGS. 9(b) and 10(b)). Accordingly, after moving along the second target trajectory $R_2$, the robot 1 can stop at the position corresponding to the end point of the second target trajectory $R_2$ without delay, to wait until the possibility of contact with the object 2 further lowers.

Furthermore, the second target trajectory $R_2$ is searched for and determined such that the first spatial element $Q_1$ comes away from the second spatial element $Q_2$ present in front thereof. This causes the robot 1 to move directly or diagonally backward such that its velocity has a backward component, which can further lower the possibility of contact with the object 2 present in front of the robot 1.

Still further, the operation of the robot 1 is controlled such that the change in orientation of the robot 1 before and after its movement along the second target trajectory $R_2$ is restricted to a minimum. For example, in the case where the robot 1 that has been moving forward along the target trajectory $R_0$ is about to move diagonally backward in accordance with the second target trajectory $R_2$, the operation of the robot 1 is controlled such that it moves with its back facing the traveling direction (see FIGS. 10(a) and 10(b)). This allows the robot 1 to move along the second target trajectory $R_2$ with the least possible change in its orientation or posture, and after it stops at the position corresponding to the end point of the second target trajectory $R_2$, it can smoothly restart the movement in accordance with the target trajectory $R_0$, without a large change in posture (see FIG. 10(c)).

On the condition that the control device 100 causes the robot (mobile apparatus) 1 to move along the second target trajectory $R_2$, it may control the operation of the robot 1 to output a voice or a signal from an output device (not shown) indicating that the robot 1 has given way to an object, or make a motion to indicate the same. For example, the voice such as "After you." may be output from the robot 1 to the human being specified as the object, or the robot 1 may move the arm 12 or the hand 13 to show that it has given way to the object. Further, one robot 1 may output a signal, using elastic vibration waves such as ultrasound or electromagnetic waves such as infrared light, that can be recognized by another robot 1 which is the object. As such, in addition to the movement of the robot 1 along the second target trajectory $R_2$ to increase the space as described above, the output of the voice or signal indicating that the robot 1 has made way, and/or the motion of the robot 1 indicating that it has made away, can further prompt the object such as a human being or another robot 1 to move through the space.

What is claimed is:

1. A mobile apparatus comprising a control device and having an operation controlled by the control device to autonomously move along a target trajectory representing changes in a target position defined in a two-dimensional model space, the control device including a first processing unit, a second processing unit, and a third processing unit, wherein the first processing unit recognizes a position of a boundary of a region through which the mobile apparatus is capable of passing as a position of a boundary of an element passing region in the model space, recognizes the mobile apparatus and a position of the mobile apparatus as a first spatial element and a first position, respectively, recognizes an object and a position of the object as a second spatial element and a second position, respectively, and recognizes the second spatial element continuously or intermittently expanded in accordance with the change in the second position as an expanded second spatial element, the second processing unit determines whether a first safety condition is satisfied based on the first spatial element, the first position, the second spatial element and the second position of the recognition result by the first processing unit, the first safety condition specifying that a possibility of contact between the first spatial element and the second spatial element in the element passing region is low, on a condition that the second processing unit determines that the first safety condition is not satisfied, the third processing unit searches for a first target trajectory based on the position of a boundary of the element passing region, the first spatial element, the first position, the expanded second spatial element and the second position of the recognition result by the first processing unit, the first target trajectory allowing the first spatial element to avoid contact with the expanded second spatial element in the element passing region, the second processing unit determines whether a second safety condition is satisfied, the second safety condition specifying that the first target trajectory has been searched for and determined by the third processing unit, on a condition that the second processing unit determines that the second safety condition is not satisfied, the third processing unit searches for a second target trajectory based on the position of a boundary of the element passing region, the first spatial element and the first position of the recognition result by the first processing unit, the second target trajectory evaluating a distance between the first spatial element and the boundary of the element passing region as a third distance and causing the first spatial element to approach a boundary of the element passing region preferentially in a direction in which the third distance is small, and the control device controls the operation of the mobile apparatus by regarding the first target trajectory as the target trajectory in a case where the second processing unit determines that the second safety condition is satisfied, whereas the control device controls the operation of the mobile apparatus by regarding the second target trajectory provisionally as the target trajectory and to cause the mobile apparatus to stop moving at a stop position, which is a position corresponding to an end point of the second target trajectory, in a case where the second target trajectory has been searched for and determined by the third processing unit.

2. The mobile apparatus according to claim 1, wherein in a state where the mobile apparatus is stopped at the stop position, the second processing unit determines whether a third safety condition is satisfied based on the first spatial element, the first position, the second spatial element and the second position of the recognition result by the first processing unit, the third safety condition specifying that the possibility of contact between the first spatial element and the second spatial element has lowered, and on a condition that the second processing unit determines that the third safety condition is satisfied, the third processing unit searches for a new trajectory as the target trajectory based on at least the position of a boundary of the element passing region, the first spatial element and the first position of the recognition result by the first processing unit.

3. The mobile apparatus according to claim 2, wherein the second processing unit determines whether the third safety condition is satisfied, the third safety condition specifying that the second spatial element has moved across a line which passes the end point of the second target trajectory and partitions the element passing region.

4. The mobile apparatus according to claim 1, wherein the second processing unit determines whether the second safety condition is satisfied, the second safety condition additionally specifying that the possibility of contact of the first spatial element with the second spatial element in the case where the first spatial element moves along the first target trajectory is low.

5. The mobile apparatus according to claim 4, wherein the second processing unit evaluates a distance between the first target trajectory and the expanded second spatial element as a first distance, and in a case where the first distance is greater than a first safety distance, the second processing unit evaluates that the possibility of contact of the first spatial element with the second spatial element in the case where the first spatial element moves along the first target trajectory is low.

6. The mobile apparatus according to claim 5, wherein the second processing unit evaluates an overlapping area between a first cell centered around a point on the first target trajectory and the element passing region excluding the expanded second spatial element in the model space as the first distance.

7. The mobile apparatus according to claim 4, wherein in a case where a line extended from the second spatial element based on the changes in the second position does not intersect the first target trajectory searched for and determined by the third processing unit, the second processing unit evaluates that the possibility of contact of the first spatial element with the second spatial element in the case where the first spatial element moves along the first target trajectory is low.

8. The mobile apparatus according to claim 1, wherein
the first processing unit recognizes the first spatial element continuously or intermittently expanded in accordance with the changes in the first position as an expanded first spatial element,
the third processing unit searches for a trajectory allowing the second spatial element to avoid contact with the expanded first spatial element in the element passing region as a predicted trajectory based on the position of a boundary of the element passing region, the first spatial element, the expanded first position, the second spatial element and the second position of the recognition result by the first processing unit, and
the second processing unit determines whether the second safety condition is satisfied, the second safety condition additionally specifying that the predicted trajectory has been searched for and determined by the third processing unit.

9. The mobile apparatus according to claim 8, wherein the second processing unit determines whether the second safety condition is satisfied, the second safety condition additionally specifying that a possibility of contact of the second spatial element with the first spatial element in the case where the second spatial element moves along the predicted trajectory is low.

10. The mobile apparatus according to claim 9, wherein the second processing unit evaluates a distance between the predicted trajectory and the expanded first spatial element as a second distance, and in a case where the second distance is greater than a second safety distance, the second processing unit evaluates that the possibility of contact of the second spatial element with the first spatial element in the case where the second spatial element moves along the predicted trajectory is low.

11. The mobile apparatus according to claim 10, wherein the second processing unit evaluates an overlapping area between a second cell centered around a point on the predicted trajectory and the element passing region excluding the expanded first spatial element in the model space as the second distance.

12. The mobile apparatus according to claim 9, wherein in the case where the first target trajectory does not intersect the predicted trajectory, the second processing unit evaluates that the possibility of contact of the second spatial element with the first spatial element in the case where the second spatial element moves along the predicted trajectory is low.

13. The mobile apparatus according to claim 8, wherein the third processing unit preferentially searches for a trajectory causing the first spatial element to move away from the predicted trajectory as the second target trajectory.

14. The mobile apparatus according to claim 1, wherein the third processing unit evaluates an overlapping area between a third cell arranged around the first spatial element and the element passing region in the model space as the third distance.

15. The mobile apparatus according to claim 1, wherein the third processing unit searches for the second target trajectory to cause the first spatial element to move away from the second spatial element present in front of the first spatial element.

16. The mobile apparatus according to claim 1, wherein the control device controls the operation of the mobile apparatus such that a change in orientation of the mobile apparatus before and after a movement of the mobile apparatus along the second target trajectory is restricted to a minimum.

17. The mobile apparatus according to claim 1, wherein on a condition that the control device causes the mobile apparatus to move along the second target trajectory, the control device controls the operation of the mobile apparatus to output a voice or a signal, or make a motion, to indicate that the mobile apparatus has given way to the object.

18. A control program causing a computer mounted on a mobile apparatus to function as a control device, wherein the mobile apparatus comprises the control device and has an operation controlled by the control device to autonomously move along a target trajectory representing changes in a target position defined in a two-dimensional model space,
the control device including a first processing unit, a second processing unit, and a third processing unit, wherein
the first processing unit recognizes a position of a boundary of a region through which the mobile apparatus is capable of passing as a position of a boundary of an element passing region in the model space, recognizes the mobile apparatus and a position of the mobile apparatus as a first spatial element and a first position, respectively, recognizes an object and a position of the object as a second spatial element and a second position, respectively, and recognizes the second spatial element continuously or intermittently expanded in accordance with the change in the second position as an expanded second spatial element,
the second processing unit determines whether a first safety condition is satisfied based on the first spatial element, the first position, the second spatial element and the second position of the recognition result by the first processing unit, the first safety condition specifying that a possibility of contact between the first spatial element and the second spatial element in the element passing region is low,
on a condition that the second processing unit determines that the first safety condition is not satisfied, the third processing unit searches for a first target trajectory based on the position of a boundary of the element passing region, the first spatial element, the first position, the expanded second spatial element and the second position of the recognition result by the first processing unit, the first target trajectory allowing the first spatial element to avoid contact with the expanded second spatial element in the element passing region, the second processing unit determines whether a second safety condition is satisfied, the second safety condition specifying that the first target trajectory has been searched for and determined by the third processing unit, on a condition that the second processing unit determines that the second safety condition is not satisfied, the third processing unit searches for a second target trajectory based on the position of a boundary of the element passing region, the first spatial element and the first position of the recognition result by the first processing unit, the second target trajectory evaluating a distance between the first spatial element and the boundary of the element passing region as a third distance and causing the first spatial element to approach a boundary of the element passing region preferentially in a direction in which the third distance is small, and the control device controls the operation of the mobile apparatus by regarding the first target trajectory as the target trajectory in a case where the second processing unit determines that the second safety condition is satisfied, whereas the control device controls the operation of the mobile apparatus by regarding the second target trajectory provisionally as the target trajectory and to cause the mobile apparatus to stop moving at a stop position, which is a position corresponding to an end point of the second target trajectory, in a case where the second target trajectory has been searched for and determined by the third processing unit.

* * * * *